United States Patent [19] [11] 4,239,562
McLean [45] Dec. 16, 1980

[54] APPARATUS FOR AND METHOD OF DETECTING RELEASE TAPE SANDWICHED BETWEEN LAYERS OF A CARPETING STRIP

[75] Inventor: Michael E. McLean, Waynesville, N.C.

[73] Assignee: Dayco Corporation, Dayton, Ohio

[21] Appl. No.: 28,783

[22] Filed: Apr. 10, 1979

[51] Int. Cl.[3] .................... B32B 5/00
[52] U.S. Cl. .................... 156/64; 156/378; 250/341
[58] Field of Search .................... 186/64, 378, 350-352, 186/361; 250/340-342, 359, 561, 562

[56] References Cited

U.S. PATENT DOCUMENTS

| | | | |
|---|---|---|---|
| 3,744,905 | 7/1973 | Smith | 250/562 X |
| 3,906,232 | 9/1975 | Meihofer | 250/341 |
| 4,047,033 | 9/1977 | Malmberg | 250/341 |
| 4,089,728 | 5/1978 | Teed | 156/352 |
| 4,092,450 | 5/1978 | Haren | 156/72 X |

*Primary Examiner*—David A. Simmons
*Attorney, Agent, or Firm*—Reuben Wolk; Charles E. Bricker

[57] ABSTRACT

An apparatus and method for detecting release tape sandwiched between a wear layer and a compressible backing material of a carpeting strip are provided.

20 Claims, 8 Drawing Figures

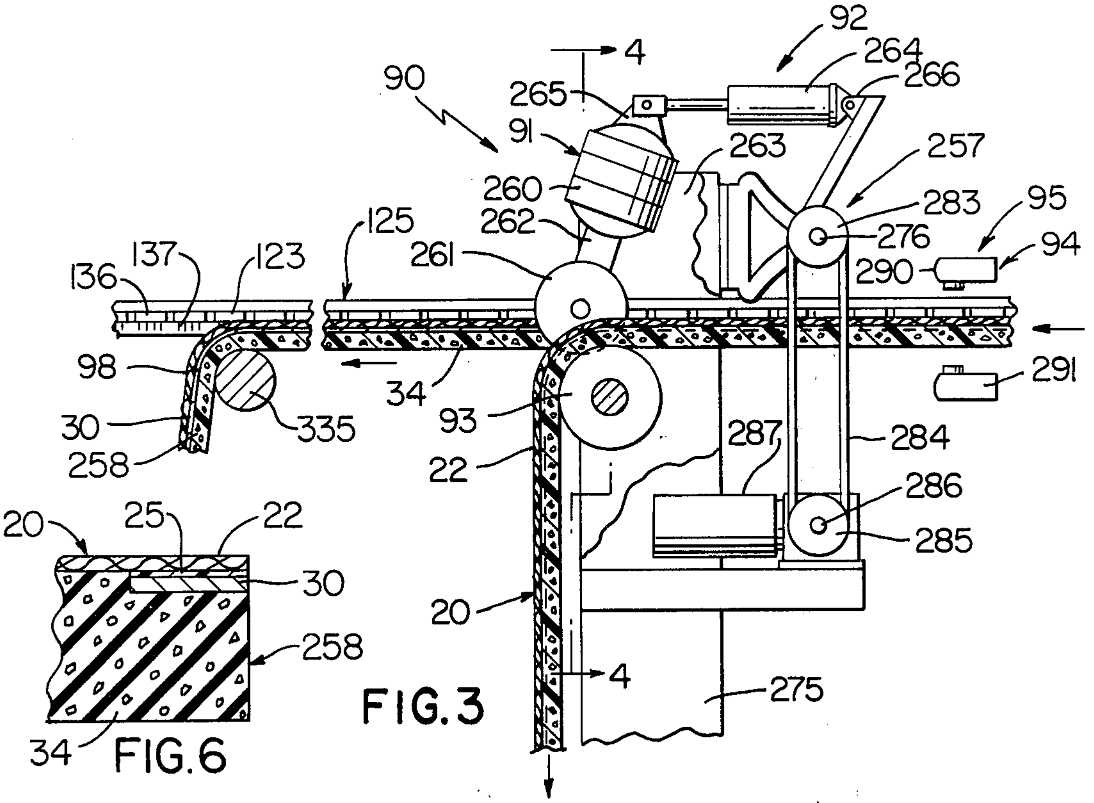
FIG.6
FIG.3
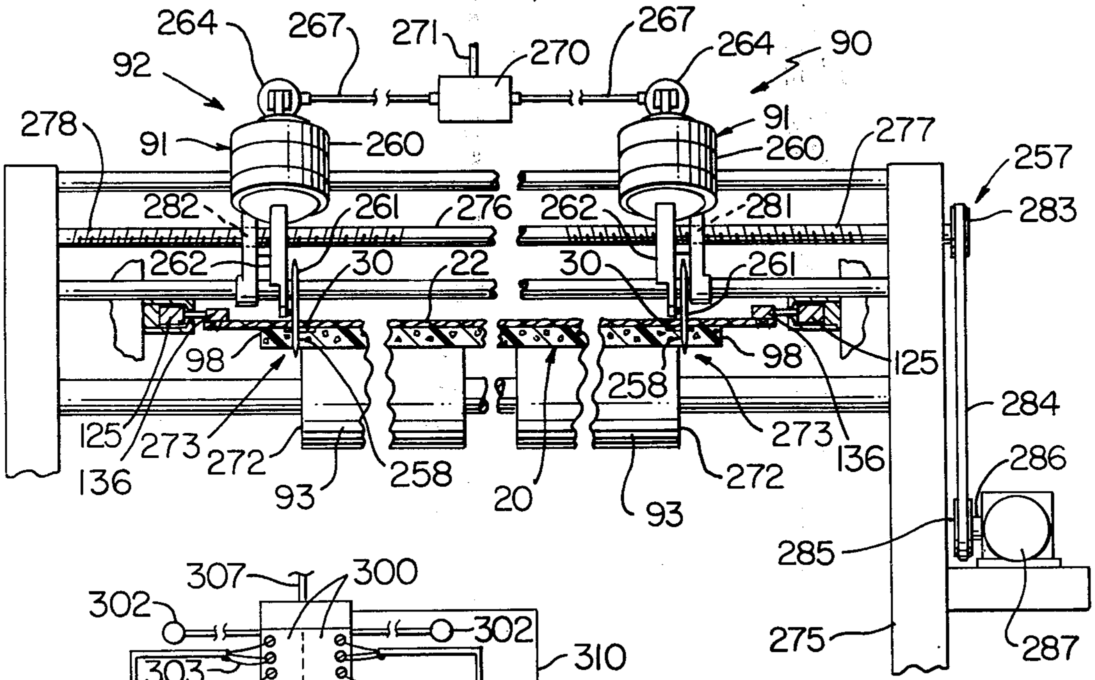
FIG.4
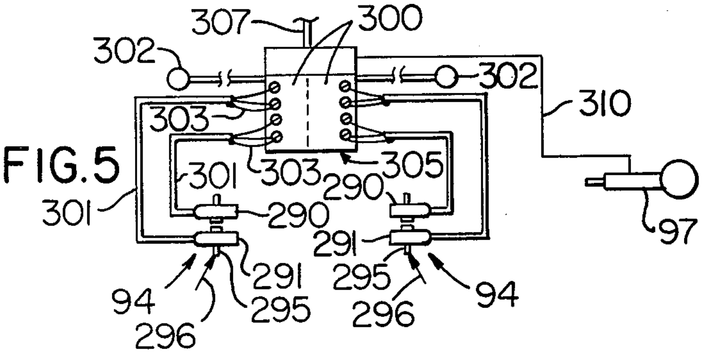
FIG.5

APPARATUS FOR AND METHOD OF DETECTING RELEASE TAPE SANDWICHED BETWEEN LAYERS OF A CARPETING STRIP

CROSS-REFERENCE TO RELATED APPLICATION

This invention is related to copending U.S. patent application, Ser. No. 28,787, filed concurrently herewith.

BACKGROUND OF THE INVENTION

1. Field of the Invention

This invention relates to carpeting strips each comprised of a wear layer bonded against a compressible resilient backing material and having release tape disposed in sandwiched relation between the wear layer and backing material at a side edge portion thereof and in particular to an apparatus and method for detecting the tape in its sandwiched position.

2. Prior Art Statement

It is known in the art to provide carpeting strips of the character mentioned and as disclosed in U.S. Pat. No. 4,092,450. However, to provide a commercially competitive carpeting strip of the character disclosed in this patent, it is necessary that such strip be produced in a continuous manner with minimum scrap and with optimum utilization of production devices and techniques to assure continuous uninterrupted production.

SUMMARY

It is a feature of this invention to provide a non-contact apparatus for detecting release tape sandwiched between a wear layer and a compressible backing material of a carpeting strip wherein such tape is removable and serves to isolate adhesive which comprises integral joining means of the carpeting strip used in defining a substantially seamless joint between adjoining identical ones of such carpeting strips.

Another feature of this invention is to provide an apparatus of the character mentioned comprising photoelectric apparatus.

Another feature of this invention is to provide an apparatus of the character mentioned wherein such photoelectric apparatus comprises a light source for emitting a light beam, a light receiver mounted to receive light from the light beam so that light from such light source is intercepted by the tape during movement of the carpeting strip during continuous making thereof, a control operatively connected to the light source and light receiver, and indicating means connected to the control for indicating the absence of release tape.

Another feature of this invention is to provide an apparatus of the character mentioned in which the light source of the photoelectric apparatus is a light emitting diode.

Another feature of this invention is to provide an apparatus of the character mentioned in which the light source of the photoelectric apparatus is a light emitting diode emitting light in the infrared region of the light spectrum.

Another feature of this invention is to provide an apparatus of the character mentioned in which the indicating means may be in the form of a visual or audible alarm.

Another feature of this invention is to provide an apparatus of the character mentioned which cooperates with a marking mechanism and continuously marks acceptable carpeting strip to indicate the presence of release tape.

Another feature of this invention is to provide an improved method of inspecting for release tape sandwiched between a wear layer and a compressible backing material of a carpeting strip.

Another feature of this invention is to provide an improved method of the character mentioned employing a non-contact apparatus.

Another feature of this invention is to provide an improved method of the character mentioned employing a non-contact apparatus in the form of a photoelectric apparatus.

Another feature of this invention is to provide an improved method of the character mentioned in which the photoelectric apparatus employs infrared light.

Therefore, it is an object of this invention to provide an improved apparatus and method having one or more of the features set forth above or hereinafter shown or described.

Other details, features, uses, objects and advantages of this invention will become apparent from the embodiments thereof presented in the following specification, claims, and drawings.

BRIEF DESCRIPTION OF THE DRAWINGS

The accompanying drawings show present preferred embodiments of this invention, in which

FIG. 3 is a view with parts in cross-section, parts in elevation, parts broken away, and parts shown schematically of trimming apparatus provided at a trimming station of the apparatus of FIGS. 1A and 1B and employed in defining the carpeting strip of FIG. 2 and trimmed ribbons on opposite sides of the trimmed carpeting strip, together with a light source and light receiver of photoelectric apparatus for detecting release tape sandwiched between layers of the carpeting strip;

FIG. 4 is a view taken essentially on the line 4—4 of FIG. 3;

FIG. 5 is a schematic view of photoelectric apparatus of this invention used at each side of the carpeting strip together with a marking mechanism operatively connected to the photoelectric apparatus; and FIG. 6 is an enlarged fragmentary cross-sectional view showing a trimmed side edge portion of a carpeting strip made by the apparatus of FIGS. 1A and 1B and wherein the apparatus of this invention is employed in detecting the release tape along such side edge portion prior to trimming thereof by the trimming apparatus.

Figures 1A, 1B, 2, 2A:
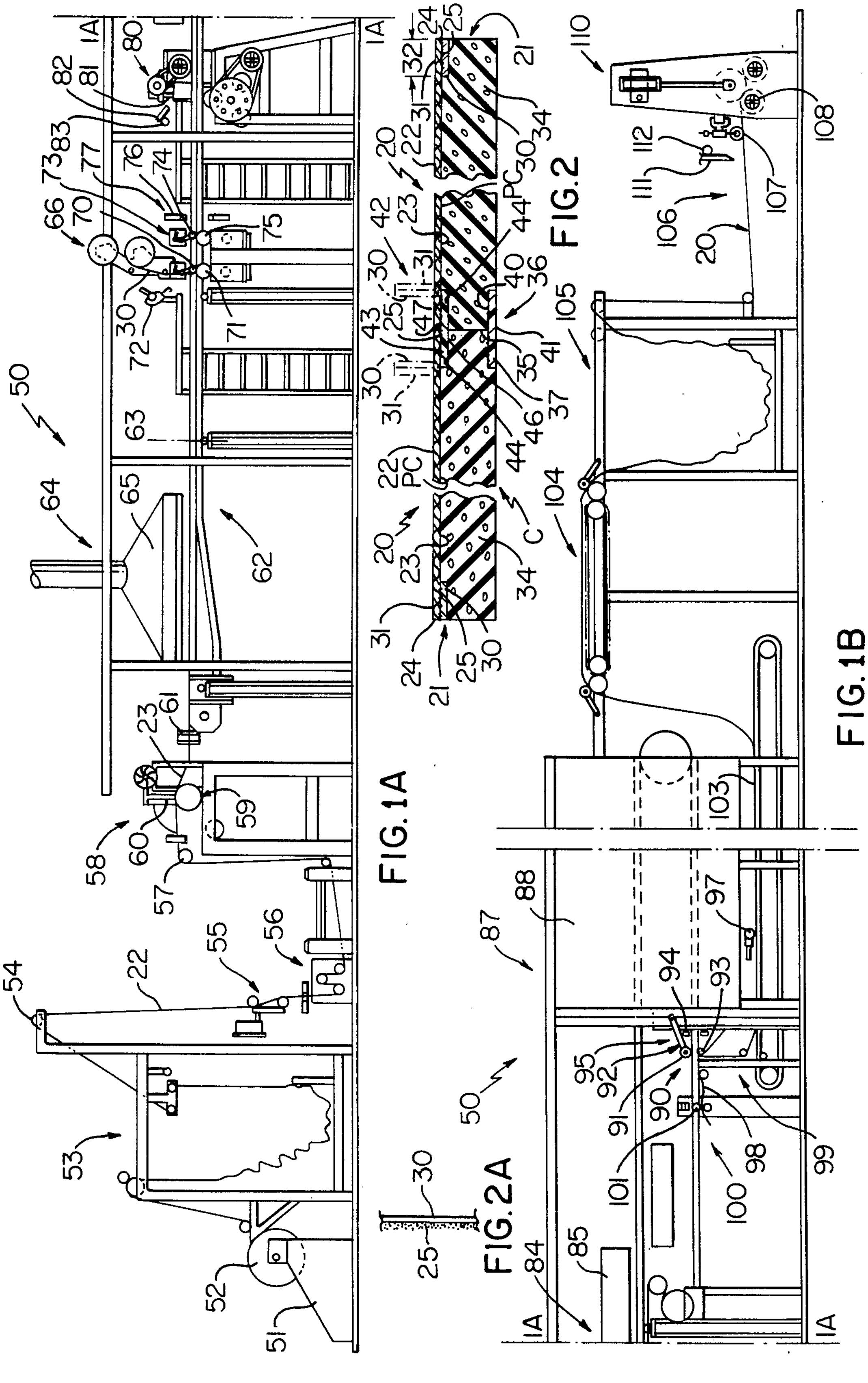
FIGS. 1A and 1B present a view in elevation of an apparatus and method with FIG. 1B being an extension of FIG. 1A upon superimposing the line 1A—1A of FIG. 1B on the line 1A—1A of FIG. 1A, and wherein such apparatus and method are employed in making a carpeting strip in which the apparatus and method of this invention are used.
FIG. 2 is a view, not drawn to scale, with parts in cross-section and parts broken away illustrating a pair of carpeting strips made by the apparatus and method of FIGS. 1A and 1B joined together to define a high strength substantially invisible joint therebetween.
FIG. 2A is an enlarged fragmentary side view particularly showing adhesive material on release tape comprising the carpeting strips of FIG. 2.

DESCRIPTION OF EXEMPLARY CARPETING STRIP AND CARPET MADE USING APPARATUS AND METHOD OF THIS INVENTION

An exemplary carpeting strip of the type disclosed herein is presented in the previously mentioned U.S. Pat. No. 4,092,450, and the disclosure of this patent is incorporated herein by reference thereto. However, in order to produce such a carpeting strip economically and with sufficient manufacturing precision to enable a typical non-professional carpet installer to install such carpeting strip and still provide a professional quality installation the improved apparatus and method illustrated in FIGS. 1A and 1B are preferably employed.

Reference is now made to FIG. 2 of the drawing which illustrates two portions of identical carpeting strips 20 (with their center portions broken away) made employing the apparatus and method of FIGS. 1A and 1B and with associated side edges in adjoining relation to define an overall carpet designated generally by the reference letter C. Each carpeting strip 20 has integral means on opposite side edges thereof and each designated generally by the reference numeral 21 for defining a substantially invisible seam between strip 20 and a substantially identical strip. Each carpeting strip 20 comprises a wear layer 22 having a bottom or inside surface 23 and such wear layer has opposed side edges each designated by the same reference numeral 24. An adhesive material in the form of a strip-like band or coating 25 is provided on the bottom surface 23 adjacent each side portion of the strip 20 and such coating is indicated by stipling in the form of spaced dots. The adhesive 25 may be in the form of adhesive material applied directly against the bottom surface 23 and protected with release tape which is free of adhesive, a comparatively thin so-called double-adhesive back tape protected on its surface away from surface 23 with release tape, adhesive material initially provided as a layer on a release tape and which remains adhered to the surface 23 upon removal of the release tape, or any suitable similar material whereby such release tape is designated by the reference numeral 30. The release tape 30 at each side portion of strip 20 enables the carpeting strip to be manufactured while defining a free part 31 of the wear layer 22 along its length and such free part 31 has a width 32 defined by the width of release tape 30 associated therewith.

The release tape 30 of this example of the invention has one surface thereof provided with a meltable adhesive 25 thereon (FIG. 2A) and such adhesive is disposed against the inside surface 23 of the wear layer 22 and serves to hold the tape 30 firmly in position. The meltable adhesive 25 on the release tape 30 is activated by heating thereof so that it will adhere to the inside surface of the wear layer 22 and such adhesive 25 remains on the wear layer 22 once the tape 30 is removed whereupon the adhesive 25 is then used in joining carpeting strips 20 to define the carpet C as will be described in more detail subsequently.

The carpeting strip 20 has a compressible polymeric sponge-like or foam-like backing material 34 bonded against its wear layer 22 and in particular, against surface 23 of such wear layer except at locations covered by the release tape. The release tape 30 at each side of strip 20 is, in essence, a dual-purpose tape which serves to isolate and maintain adhesive 25 ready for use by providing a freshly exposed adhesive surface upon exposing such adhesive 25 by removal of the tape 30 as well as isolating a width portion of the compressible backing material 34 from the wear layer 22 upon integrally forming the backing material 34 against the tape 30. Each tape 30 defines the above-mentioned free part 31 of the wear layer 22 for a purpose now to be described.

In particular, to install a pair of carpeting strips 20 in adjoining relation to define a carpet C as illustrated in FIG. 2, a pair of carpeting strips 20 are placed with associated edges 35 in abutting relation as shown at 36 in FIG. 2. If desired, a suitable so-called double-adhesive-back tape 37 may be used to fasten the bottom surfaces of the backing material 34 immediately adjacent edges 35 against an associated supporting floor (not shown) by adhering one surface 40 of the tape 37 to the compressible backing material 34 and the other surface 41 of such tape to such supporting floor, or the like. The tape 37 also serves to hold the edges 35 against movement during the seaming operation whereby the edges 35 are fastened together so as to define a substantially invisible seam therebetween as will now be described.

In particular, the free portions 31 of the wear layers 22 of carpeting strips 20 with their release tapes 30 adhered are lifted substantially vertically as indicated by dotted lines at 42 in FIG. 2. With the free portions 31 thus lifted, suitable support means 43 (of any type known in the art) is bonded against what will be referred to as isolated portions 44 of the backing material 34. The isolated portions 44 referred to are defined by associated release tapes 30. The support means 43 in this example comprises double-adhesive-back-tape with the bottom surface 46 of tape 43 being bonded against the isolated portions 44. At this point, the release tape 30 is removed from one of the carpeting strips 20 to provide freshly exposed adhesive 25 whereupon the free portion 31 is adhered against the top adhesive surface 47 of the tape 43. A similar procedure is followed with the free portion 31 of the wear layer 22 of the other carpeting strip 20 whereby the top surfaces of the free parts 31 are disposed in substantially coplanar relation while defining a substantially invisible junction or seam between adjoining side edges of the carpeting strips 20.

It will be appreciated that this entire operation of joining side edges of a pair of carpeting strips 20 may be achieved without requiring special tools and while employing precision factory cut edges to define a substantially invisible seam between carpeting strips. It will also be appreciated that instead of tape 43 any other suitable support means known in the art may be used to bridge between and join side edge portions of a pair of carpeting strips 20.

DESCRIPTION OF THE OVERALL APPARATUS AND METHOD FOR CONTINUOUSLY PRODUCING A CARPETING STRIP

Having described the carpeting strip 20 and a typical carpet C defined using a pair of such strips, the detailed description will now proceed with an apparatus and method which may be used to make such a carpeting strip and such apparatus and method is illustrated in FIGS. 1A and 1B and designated generally by the reference numeral 50. The apparatus 50 comprises a so-called let-off device 51 which supports a supply roll 52 of a suitable wear layer defining material which is preferably in the form of a fabric and such fabric wear layer will be designated by the same reference numeral 22 as in the completed carpeting strip 20. The supply roll 50 is supported by device 51 for controlled unwinding rotation and the fabric wear layer 22 is fed through a so-called J-box fabric accumulator assembly 53 which may be of any suitable type known in the art and for purposes known in the art.

The fabric wear layer 22 is moved around a turn roll 54 and fed vertically downwardly through a floating roll steering guide assembly 55 which serves to align such wear layer for subsequent operations. The wear layer 22 is then moved through an adjustable fabric tension control assembly 56 which in this example is in the form of a three roll assembly. The assembly 56 provides a controlled constant tension on the wear layer enabling processing thereof in a continuous manner.

The tensioned wear layer 22 is continued over an expander roll 57 which may be a bowed roll which spreads or opens up spaces between yarns or filaments of the fabric for coating purposes. The wear layer then continues to a precoat station 58 of the apparatus 50. At station 58 a so-called knife over roll coater 59 having a suitable knife or doctor blade 60 associated therewith is used to apply a suitable polymeric precoat PC (FIG. 2) between release tapes 30 on the inside surface 23 of the wear layer 22. The precoat PC seals the interstices in the wear layer 22, promotes adhesion of polymeric material defining the backing material 34 to be coated thereagainst, and controls the feel or hand of the wear layer 22.

As the wear layer 22 exits the precoating station 58 and continues through the apparatus 50, photoelectric detector devices 61 are provided and sense opposite side edges thereof and provide appropriate signals which are used to make adjustments in the apparatus 50 which assure precision guiding of the opposed fabric edges into the fabric stretching or swing section of a tenter assembly 62. The opposed edge portions of the fabric wear layer 22 are attached to tenter pins, not shown, by urging the fabric so that such pins extend therethrough.

The tenter assembly 62 serves to initially gradually stretch the wear layer in its swing section to a predetermined precise width shown basically at location 63 which commences what will be referred to as a constant width section of the tenter assembly. During the time that the wear layer 22 is placed on the tenter pins and stretched to a constant width the precoat applied at the precoat station 58 is dried at a precoat drying station 64 by a heater 65 which may be of any suitable type and in this example is in the form of an electrical infrared heater.

The wear layer 22 then continues to a taping station 66 where release tape 30 is applied to the inside or normally concealed surface 23 (concealed in the completed carpeting strip 20) of the wear layer at spaced apart locations on opposite side portions of such wear layer employing a pair of taping devices each at an associated side portion of the wear layer 22 with each taping device having a tape-applying roller 70. During application of each release tape 30 the tape is supported by backup means in the form of a backup roll 71 associated with each tape applying roller 70. As indicated earlier, the release tape 30 is of the type which has adhesive 25 thereon and such adhesive is heat activated immediately prior to application of the tape 30 against the wear layer 22. In this example the heat activation is provided by a hot air blower 72 associated with each tape 30 and the blower 72 has a hot air discharge nozzle. The adhesive 25 remains on the inside surface 23 of the wear layer 22 after removal of the tape 30 as previously mentioned.

The apparatus and method 50 employ a tape bonding station 73 where a pressure roller 74 is employed in cooperation with a backup roller 75. The action of the rollers 74–75 at station 73 assures that the tape 30 applied at the taping station 66 is urged more tightly against the inside surface 23 of the wear layer 22 whereby the final carpeting strip 20 is assured of having the required release tape 30.

The apparatus and method 50 also employ a photoelectric device 76 in association with each tape 30 at uncovered release tape detection station 77 to detect the presence of such tape at each side portion of the wear layer 22. In the event tape 30 is not present on either side portion of such wear layer 22, for any reason, a suitable alarm or signal is provided to indicate the absence of release tape 30 and thereby allow appropriate corrective action to be taken.

The wear layer 22 with release tape 30 adhered to its opposite side portions is then introduced through a backing cushion applying station or foam applying station 80 where a suitable thickness of compressible yet resilient backing material is applied thereon and such material may be in the form of sponge-like rubber, or any suitable latex foam and preferably is in the form of a no-gel foam, i.e., such foam being free of added chemical gelling agents. The backing material 34 is shown in its completed and cured condition in the final carpet C in FIG. 2.

In one exemplary embodiment of a carpeting strip 20 the latex foam cushion 34 was made utilizing a rubber foam latex such as styrene-butadiene rubber. Foam latex is applied at station 80 preferably employing a doctor blade or knife to control the thickness of the foam. In this example a doctor blade 81 is used in spaced relation above wear layer 22 and foam defining the foam cushion 34 is conveyed through a nozzle 82 which is reciprocated across the width of the wear layer 22 and cooperates with the doctor blade 81 to provide a controlled height of the latex foam. Suitable means indicated schematically by a circle 83 may be provided for moving the nozzle 82 in a reciprocating manner across the wear layer and such means 83 may be provided with suitable automatic or semit-automatic controls.

The foam material defining the latex foam cushion 34 is suitably gelled on wear layer 22 at a foam gelling station 84 employing a heating apparatus which in this example is in the form of an oven or lamp assembly 85, FIG. 1B, as it exits the foam applying station 80. The gelling apparatus 85 of this example consists of a plurality of electric heat lamps which serve to stabilize the latex foam cushion for further processing.

The carpet construction defined by wear layer 22 with release tape 30 extending along opposite side edge portions thereof and with the latex foam cushion bonded thereagainst, thereby concealing the tapes 30, is then passed through a drying and curing station 87 for drying and curing purposes. At station 87 an oven 88 of any suitable type known in the art may be employed and may comprise gas fired heaters, electric heaters, or other suitable heating means. The carpet construction of this example makes a plurality of passes through the oven 88 to complete the drying and curing thereof.

The dried and cured carpeting strip 20 with tape 30 along its opposite side portions is introduced into a carpeting strip trimming station 90 immediately after inspection for the presence of covered or concealed release tape 30 as will be described subsequently. At the trimming station 90 a pair of rotary slitters or cutters 91 comprising a cutting apparatus 92 are used to cut the carpeting strip and define a corresponding pair of trimmed strips or ribbons of scrap material which are removed from the apparatus 50 in a manner to be described subsequently. The cutters 91 associating with the two release tapes are precisely controlled and the width of the tapes is such that splitting is achieved so as to define a completed carpeting strip 20 having a precision width while still defining cut tape edges along the full length of the carpeting strip.

The rotary cutters 91 are suitably supported on the cutting apparatus 92 to assure that the carpeting strip 20 is of a precision width and further assure that the width of each release tape 30 remaining with the carpeting strip 20 is sufficient to enable joining of two strips 20 in the manner previously described. Usually three-quarters of an inch of release tape along each side strip 20 is sufficient to define a high strength joint. The cutting apparatus 92 at the cutting station 90 includes a pair of backup rollers 93 each associated with a rotary cutter 91.

The apparatus 50 has a covered or concealed release tape detection station 95 upstream of the trimming station as mentioned earlier where a pair of photoelectric devices 94 are provided and each operatively associates with a cutter 91 enabling the rotary cutters 91 to be adjusted and set for cutting purposes to provide the required width of release tape as well as define the carpeting strip 20 having edges 35 which are factory cut precision edges. The photoelectric device 94 also operatively associates with a marking mechanism 97 comprising the apparatus 50 which operates to continuously mark the foam backing layer 34 with the manufacturers identifying data and or advertising as long as the apparatus 50 is operating satisfactorily. However, if the release tape 30 associated with a particular photoelectric device 94 is either of insufficient width or not present the marking mechanism is suitably automatically operated to cease its marking action. This procedure allows inspection downstream of the mechanism, visually or by other means, whereby a length of carpeting strip, which is defective because it does not have the required width of release tape at each side portion thereof of such tape is not present, may be cut away.

After trimming or cutting the carpeting strip at cutting station 90 a pair of scrap strips or ribbons 98 of trimmed material remain on the tenter pins. The ribbons 98 are conveyed to a trim removal station 100 which employs a trim removal apparatus 101 which operates with associated apparatus to pull the strips 98 from the tenter pins of the tenter assembly whereupon the pulled strips are scrapped.

The trimmed carpeting strip 20 with the correct width of release tape 30 fixed to its opposite side portions is then conveyed vertically downwardly from the backup rollers 93 as shown at 99 and then horizontally beneath the oven 88 as shown at 103 for cooling purposes. The completed carpeting strip is then moved upwardly and over a horizontal section 104 and fed through a conventional J-box accumulator 105 for build up of a quantity of carpeting strip 20 for windup purposes.

The carpeting strip 20 is inspected at an inspection station 106 and predetermined lengths thereof are measured by a length gage 107 and suitably wound to define a supply roll 108 of carpeting strip 20 at a windup station 110. A cutting device indicated schematically by a fragmentary cutting blade 111 is employed to cut the strip 20 across its width once a predetermined length thereof has been wound to define a roll 108. The blade 111 may be reciprocated across the apparatus 50 by a suitable device 112 which is indicated schematically by a circle.

Suitable edge sensing means is provided at station 110 to assure windup of roll 108 in a smooth manner. After windup, the completed roll of carpeting strip 20 is then suitably packaged, either in a carton or wrapped in a protective covering such as a protective plastic film and removed from the windup station 110 employing suitable mechanism such as a fork lift truck, or the like, for storage and/or shipment.

The release tape 30 used in the carpeting strip may be made of paper, plastic or other polymeric material, or any suitable material which is capable of having adhesive material 25 provided thereon and which is capable of being bonded to the inside surface 23 of the wear layer 22. Further, the construction of the release tape 30 is such that once it is removed from its carpeting strip to install same to define a carpet C, the adhesive material 25 originally protected by the tape, remains on the layer 22 and being freshly exposed provides maximum adhesive capabilities.

It will also be appreciated that other apparatus and techniques may be used in the apparatus 50. For example, a bed plate or similar support structure may be used instead of a support roll at the foam applying station 80. In addition, other means such as mechanical height measurement means may be employed at the uncovered release tape detection station 77 to measure the presence of release tape immediately after application thereof instead of using photoelectric devices. In addition, it will also be appreciated that instead of rotary knives at the trimming station 90 other slitting methods and apparatus may be employed, such as laser devices, water jets, shear cut knives, score cut knives, and the like.

For an understanding of this invention only the above general description of the overall apparatus and method 50 has been presented; however, if a more detailed understanding of certain components or subsystems of the apparatus and method 50 is desired reference may be made to the above cross-referenced U.S. application Ser. No. 28,787 which is incorporated herein by reference thereto.

THE TRIMMING STATION

The dried and cured carpeting strip 20 with tape 30 along its opposite side portions is introduced into a carpeting strip trimming station 90 (FIGS. 3–4) where trimming apparatus 92 is used to cut the carpeting construction and define the carpeting strip 20 and a pair of trimmed strips 98 or ribbons of scrap material on opposite sides thereof which are removed from the apparatus 50.

The trimming apparatus 92 has cutting means in the form of a pair of rotary cutters 91 each of which is employed for cutting through the wear layer 22, tape 30, and backing material 34. The apparatus 92 also has means 257 for positioning each cutter 91 to define the width of the carpeting strip with precision while assuring a predetermined width of release tape 30 remains on the carpeting strip 20 after cutting by the cutters 91 while providing a precision planar cut side edge on each side edge of such carpeting strip designated generally by the reference numeral 258 in FIGS. 3 and 6. The precision planar cut side edge 258 is defined by an edge of the wear layer 22, adhesive 25, release tape 30, and backing material 34. A corresponding planar cut side edge 258 is defined on each ribbon 98 and it will be appreciated that the edge of the adhesive 25 is exposed on both the carpeting strip and ribbon.

The carpeting strip 20 is particularly adapted to have such a precision cut side edge thereof disposed in abutting relation against a substantially identical carpeting strip having a substantially identical cut side edge while removing the tape 30 from the carpeting strip and a similar tape from the identical carpeting strip and bonding the free parts 31 of the wear layer (as previously described in connection with FIG. 2) together against support means 43 bridging an isolated portion of backing material of the carpeting strip and a similar isolated portion of backing material of the identical carpeting strip to thereby define a substantially invisible joint therebetween.

Each rotary cutter 91 comprises an electric motor assembly 260 which drives a rotary blade 261 through a mechanical connection 262. Each motor assembly 260 is pivotally supported on a support structure 263 and the pivoting of the assembly 260 is provided by an actuator in the form of an air cylinder 264. Each cylinder 264 has its telescoping rod end pivotally connected to a lug 265 on the cutter 91 and its opposite end pivotally connected on another lug 265 provided on the support structure 263. Each air cylinder 264 is provided with air under pressure through a conduit assembly 267 which is controlled by a control system 270 which is in turn supplied with air under pressure from a source 271 whereby each cutter 91 and its blade 261 are moved into and out of cutting engagement.

The cutting apparatus 92 has a backup roller 93 operatively associating with each rotary cutting blade 261 of each cutter 91. Each roller 93 has a planar side edge 272 thereof disposed on one side of and closely adjacent its associated rotary cutting blade 261 as shown at 273 to thereby define the precision cut edge 258 at each side of the carpeting strip 20. Although in this example, the backup rollers 93 are disposed inwardly of their associated blades 261, toward the center of the apparatus, it will be appreciated that such rollers may be disposed outwardly of blades 261.

The trimming apparatus 92 has a pair of support columns 275 on opposite sides thereof and such columns are particularly adapted to support the positioning means 257 for positioning each cutter 91 and in particular each rotary cutting blade 261 independently of the tenter assembly 62. The positioning means 257 comprises a rod 276 which has right hand threads 277 at one end portion thereof and left hand threads 278 at its opposite end portion. The right hand cutter 91 (as viewed in FIG. 4) has a threaded member 281 provided with corresponding right hand threads and which is in threaded engagement with the threaded portion 277; and, the left hand cutter 91 has a threaded member 282 which is provided with left hand threads and is in threaded engagement with the threaded portion 278. The opposite ends of the rod 276 are suitably supported in anti-friction bearings provided in associated columns 275 so that the member 276 is disposed substantially horizontally above the carpet construction.

The means 257 for positioning cutters 91 also comprises a pulley 283 fixed to one end of the rod 276 and such pulley is driven by an endless driving member which may be in the form of an endless power transmission belt 284. The belt 284 is operatively connected to a pulley 285 which is fixed to a shaft 286 which is driven by a reversible electric motor 287. The positioning means 257 enables movement of the cutters 91 toward each other by rotating the motor 287 in one direction and movement of the cutters 91 away from each other by rotating the motor 287 in an opposite direction.

The trimming apparatus 92 is adjusted so that the tape 30 is cut by cutters 91 at the desired position at each side edge of the carpet construction to define cut edges 258. Furthers, the cutting action is controlled to provide a minimum width of release tape 30 (generally of the order of $\frac{3}{4}$ of an inch or more) at each side edge of carpeting strip 20 for the purpose of providing an invisible joint between adjoining carpeting strips 20 and in a manner previously described. To assure that each release tape 30 extends to its cut edge 258 and the trimming or cutting by cutters 91 is achieved as desired, a concealed release type detection apparatus is provided at station 95, as will be described subsequently.

THE CARPETING STRIP MOVING MEANS

The apparatus 50 has means for continuously moving the wear layer 22 in a rectilinear path and such moving means comprises a tenter assembly 62 as previously mentioned. The tenter assembly 62 has an upstream swing section and a downstream constant width section with a pair of endless chain drive mechanisms or endless chains 125, one on each side of the apparatus 50, providing movement through both the swing and constant width sections, FIGS. 3 and 4. Each of the endless chains 125 comprises a plurality of chain links 123 interconnected by pins, as is known in the art. Each chain link has a so-called pin plate 136 suitably fixed thereon and each pin plate has tenter pins 137 fixed thereto and extending therefrom. The tenter pins hold the wear layer 22 at a precise width in the constant width section of the tenter assembly to enable fixing each of the release tapes 30 against such wear layer 22 at a precise position. The pair of endless chains 125 on opposite sides of the tenter assembly 62 are driven by suitable drive sprockets as is known in the art.

As mentioned earlier, after trimming or cutting the carpeting strip 20 at the trimming station 90 a pair of scrap strips or ribbons 98 of trimmed material remain on the tenter pins 137. The ribbons 98 are conveyed to the trim removal station 100 which employs trim removal apparatus or stripping apparatus 101 (FIG. 1B) for stripping the ribbons 98 from the tenter pins of the tenter assembly 62 for scrapping purposes.

CONCEALED RELEASE TAPE DETECTION STATION

As previously mentioned the overall apparatus and method 50 have a concealed release tape detection station 95 for the purpose of detecting release tape 30 in its sandwiched position between wear layer 22 and the backing material 34. At station 95 a pair of non-contact apparatus shown as a pair of photoelectric apparatus or devices 94 are provided each for detecting an associated release tape 30 in its sandwiched or what might be considered concealed position, i.e., concealed such that it is not visible by the human eye when viewed normally or perpendicularly toward either the wear layer 22 or the backing material 34.

The photoelectric apparatus 94 comprises what may be considered a sending unit or light source 290 for emitting a light beam and an associated receiving unit or light receiver 291 mounted opposite the light source 290 for receiving the light beam from such light source. Suitable mounting means shown as mounting brackets 295 (FIG. 5) are provided for mounting the light source and light receiver so that with each tape 30 properly attached light from each light source 290 is intercepted by an associated tape 30 before it reaches the associated receiver 291 with movement of the carpeting strip in a rectilinear path during continuous making of the carpeting strip 20. Each mounting bracket 295 associating with a member 290 or 291 may be suitably mounted on structure associated with the apparatus 50. In addition, adjusting means for each bracket 295 may be provided and each adjusting means is indicated schematically by an arrow 296. The adjusting means 296 enables precise adjustment of each set of components 290 and 291 as required to provide sensing of the associated tape 30 and trimming of an associated ribbon 98 so that a factory cut edge 258 is defined by the trimming apparatus 92 with such edge 258 being as previously defined and as shown in FIG. 6.

Each apparatus 94 has control means in the form of a control 300 which is operatively connected to an associated light source 290 by a cable assembly 301 and similarly operatively connected to an associated light receiver 291 by another similar cable assembly also designated 301. Each apparatus 94 also has indicating or signalling means 302 connected to its control 300 for indicating the absence of release tape 30. Each cable assembly 301 connecting an associated component 290 and 291 to its control 300 may be of any suitable type known in the art and may be a shielded assembly 301 having a pair of electrical leads and a ground lead 303 for the shield.

The control 300 associated with each apparatus 94 comprises an overall control system for both apparatus 94 and such overall system is designated by the reference numeral 305. In addition, the controls 300 may have and share common components of the overall control system 305.

Each photoelectric apparatus 94 is shown with a separate indicating or signalling means 302 and this enables an operator of the apparatus 50 to determine which release tape 30 has become severed or discontinued. However, it will be appreciated that a single indicating or signalling means 302 may be provided and operatively connected to the system 305 to provide an indication or signal if either one of the photoelectric apparatus 94 indicates that its release tape 30 is not present. The overall control system 305 is preferably of a so-called plug-in modular type and is provided with power from any suitable power source through a cable assembly 307.

As previously mentioned the apparatus 50 has a marking mechanism 97. The marking mechanism 97 is operatively connected to the control system 305 by a cable assembly 310 and hence to both controls 300; and, the marking mechanism 97 operates to continuously mark the compressible backing material portion or foam backing layer 34 of the carpeting strip 20 with the manufacturers identifying data and/or advertising as long as tape 30 is present as required. However, if the release tape 30 associated with either photoelectric device 94 is either of insufficient width or not present, the marking mechanism 97 is suitably automatically operated to cease its marking action. This procedure allows inspection of the carpeting strip downstream of the mechanism 97 visually or by other means whereby, as mentioned earlier, a length of carpeting strip, which is defective because it does not have the required width of release tape at each side portion thereof or such tape is not present, may be cut away.

The marking mechanism 97 is energized through cable assembly 310 in response to the presence of release tape 30 in the required manner on both side edge portions of the carpeting strip 20. However, in the event that each of the two release tapes 30 is either not present or is not in the required position, two things occur simultaneously. First, the associated indicating means 302 is energized by a control 300 and control system 305 and the operator of the apparatus 50 may determine which side of the carpeting strip 20 has a defect. Secondly, and simultaneously a signal is provided by the control system 305 through the electrical cable assembly 310 to stop operation of the marking mechanism 97. The marking mechanism 97 remains inoperative until a correct signal is obtained from both photoelectric apparatus 94 to indicate that release tape 30 is present in the required manner.

Each light source 290 of each photoelectric apparatus 94 preferably comprises a light emitting diode and such diode preferably is of the type that emits light in the infra-red region of the light spectrum. It will be appreciated that with utilization of the infrared light it is possible to detect release tape 30 even though it is in a sandwiched position and concealed from view to the human eye.

Each apparatus 94 is set up and adjusted at the beginning of a manufacturing cycle to provide a particular electrical signal to the control 305 while passing an associated side edge portion of the carpeting strip 20 including wear layer 22 and backing material 34 between members 290 and 291 with release tape 30 absent. The type and magnitude of this signal is such that when release tape 30 is interposed between an associated light source 290 and light receiver 291 of a particular photoelectric apparatus 94 as required there is such a substantial change in the signal that the associated control 300 is activated in the required manner. Such control 300 then energizes the appropriate circuits to prevent actuation of its indicating means 302 while energizing circuits of system 305 to assure the marking mechanism 97 is energized.

Each indicating means 302 may be of any suitable type known in the art and the schematic presentation of FIG. 5 is intended to show indicating means in the form of an alarm such as a light visible to the human eye or other means, an audible alarm, and the like.

Each photoelectric apparatus 94 enables continuous inspection of carpeting strip 20 during continuous making thereof to detect the presence or absence of release tape 30. This continuous inspection is provided by a non-contact system, (i.e., no mechanical contact of the carpeting strip 20 with inspecting devices, etc.) and such continuous inspection is highly reliable.

Any suitable photoelectric apparatus 94 known in the art may be employed. One example of an apparatus which has been used successfully is manufactured by Electronics Corporation of America, Photoswitch Division, One Memorial Drive, Cambridge, Mass., 02142, and sold as a Series 4000 LED photoswitch.

In this disclosure of the invention sources of power including electrical power, fluid power such as air under pressure, and the like, for the various components have not been illustrated and described; however, it is to be understood that such power sources may be provided employing any suitable means known in the art. It will also be appreciated that the supports and mechanical drives for the overall moving means of the apparatus 50 including the tenter assembly 62 and for various components of such apparatus have also not been illustrated and described herein and it is to be understood that any suitable means known in the art may be used to define such supports and drives.

While present exemplary embodiments of this invention, and methods of practicing the same, have been illustrated and described, it will be recognized that this invention may be otherwise variously embodied and practiced within the scope of the following claims.

What is claimed is:

1. In an apparatus for continuously making carpeting strip having integral joining means; said apparatus comprising means for continuously moving a wear layer having a bottom surface and opposed side edges in a rectilinear path; a device for fixing a release tape against said bottom surface adjacent an associated side edge portion of said wear layer; said release tape defining a free part of said wear layer disposed thereagainst; and means for forming a compressible backing material against said bottom surface and against said tape so that said tape isolates a portion of said backing material from said wear layer and is sandwiched there-between; said tape being removable and serving to isolate adhesive comprising said integral joining means; the improvement comprising; a photoelectric apparatus for detecting said release tape in its concealed sandwiched position.

2. An apparatus for making carpeting strip as set forth in claim 1 in which said photoelectric apparatus detects both the presence and width of said release tape and comprises a light source for emitting a light beam, a light receiver mounted opposite said light source for receiving said light beam, means mounting said light source and light receiver so that light from said light source is intercepted by said tape with movement of said carpeting strip in said rectilinear path during continuous making thereof, control means operatively connected to said light source and light receiver, and indicating means connected to said control means and providing an indication in the event said release tape is absent as well as in the event said release tape is of insufficient width.

3. An apparatus for making carpeting strip as set forth in claim 2 in which said light source of said photoelectric apparatus comprises a light emitting diode.

4. An apparatus for making carpeting strip as set forth in claim 2 in which said light source of said photoelectric apparatus comprises a light emitting diode emitting light in the infrared region of the light spectrum.

5. An apparatus for making carpeting strip as set forth in claim 4 in which said indicating means comprises an alarm.

6. An apparatus for making carpeting strip as set forth in claim 5 in which said alarm is a visual alarm in the form of a light.

7. An apparatus for making carpeting strip as set forth in claim 5 in which said alarm is an audible alarm.

8. An apparatus for making carpeting strip as set forth in claim 5 and further comprising a marking mechanism operatively connected to said control means, said marking mechanism operating in response to the presence and to the provision of the required width of said release tape to continuously mark the compressible backing material portion of said carpeting strip formed against said bottom surface during continuous making of said carpeting strip.

9. In an apparatus for continuously making carpeting strip having integral joining means; said apparatus comprising means for continuously moving a wear layer having a bottom surface and opposed side edges in a rectilinear path; a pair of devices for fixing a pair of release tapes against said bottom surface; each of said devices fixing its release tape adjacent an associated side edge portion of said wear layer; and means forming a compressible backing material against said bottom surface and against said tapes so that each of said tapes isolates a portion of said backing material from said wear layer and is sandwiched therebetween; each of said tapes being removable and serving to isolate adhesive comprising said integral joining means; the improvement comprising; a photoelectric apparatus for detecting each release tape in its concealed sandwiched position.

10. An apparatus for making carpeting strip as set forth in claim 9 in which each photoelectric apparatus detects both the presence and width of its release tape and comprises a light source for emitting a light beam, a light receiver mounted opposite said light source for receiving said light beam, means mounting said light source and light receiver so that light from said light source is intercepted by an associated tape with movement of said carpeting strip in said rectilinear path during continuous making thereof, control means operatively connected to said light source and light receiver, and indicating means connected to said control means and providing an indication in the event its release tape is absent as well as in the event its release tape is of insufficient width.

11. An apparatus for making carpeting strip as set forth in claim 10 in which said light source of each photoelectric apparatus comprises a light emitting diode.

12. An apparatus for making carpeting strip as set forth in claim 11 in which said light source of each photoelectric apparatus comprises a light emitting diode emitting light in the infrared region of the light spectrum.

13. In a method of continuously making carpeting strip having integral joining means; said method comprising the steps of continuously moving a wear layer having a bottom surface and opposed side edges in a rectilinear path; fixing a pair of release tapes against said bottom surface with a pair of taping devices with each device fixing its release tape adjacent an associated side edge portion of said wear layer; and forming a compressible backing material against said bottom surface and against said tapes so that each of said release tapes isolates a portion of said backing material from said wear layer and is sandwiched therebetween; each of said release tapes being removable and serving to isolate adhesive comprising said integral joining means; the improvement comprising the step of; inspecting said carpeting strip during continuous making thereof with photoelectric apparatus associated with each release tape to detect each release tape in its concealed sandwiched position.

14. A method of making carpeting strip as set forth in claim 13 in which said inspecting step comprises inspecting for both the presence and width of said release tapes with a pair of photoelectric apparatus each having a light source for emitting a light beam and a light receiver for receiving said light beam, mounting the light source and light receiver of each apparatus so that light from the light source is intercepted by an associated release tape with movement of said carpeting strip in said rectilinear path during continuous making thereof, connecting the light source and light receiver of each apparatus to control means, and operating indicating means with said control means to provide an indication in the event release tape is absent as well as in the event release tape is of insufficient width.

15. A method of making carpeting strip as set forth in claim 14 in which said inspecting step comprises inspecting with said pair of photoelectric apparatus each employing a light emitting diode as a light source.

16. A method of making carpeting strip as set forth in claim 14 in which said inspecting step comprises inspecting with said pair of photoelectric apparatus each employing a light emitting diode as a light source which emits light in the infrared region of the light spectrum.

17. A method of making carpeting strip as set forth in claim 16 in which said operating step comprises operating an alarm.

18. A method of making carpeting strip as set forth in claim 16 and further comprising the step of energizing a marking mechanism with the control means of the photoelectric apparatus to mark said carpeting strip in response to the presence of sandwiched release tape in the required manner.

19. A method as set forth in claim 18 in which said step of energizing said marking mechanism comprises energizing a printing wheel to mark the backing material portion of the carpeting strip.

20. A method of making carpeting strip as set forth in claim 14 in which said step of mounting the light source and light receiver of each apparatus comprises the step of adjusting the light source and light receiver of each apparatus to assure that such light source is intercepted by an associated tape once the associated tape is bonded against the wear layer in the required position.

* * * * *